United States Patent
Grob et al.

(12) 
(10) Patent No.: US 6,356,806 B1
(45) Date of Patent: Mar. 12, 2002

(54) METHOD FOR HANDLING A VOLTAGE DROP IN THE CONTROL OF A ROBOT AND FOR RESTARTING A ROBOT FOLLOWING A VOLTAGE DROP

(75) Inventors: Franz Grob, Augsburg; Stefan Sturm, Kaisheim; Carsten Spieβ, Augsburg, all of (DE)

(73) Assignee: Kuka Roboter GmbH (DE)

(*) Notice: Subject to any disclaimer, the term of this patent is extended or adjusted under 35 U.S.C. 154(b) by 0 days.

(21) Appl. No.: 09/459,269

(22) Filed: Dec. 10, 1999

(30) Foreign Application Priority Data

Dec. 12, 1998 (DE) ......................................... 198 57 436

(51) Int. Cl.$^7$ .............................................. G06F 19/00

(52) U.S. Cl. ........................ 700/245; 700/256; 700/264; 714/15; 714/24; 361/680; 361/683; 361/71; 361/72; 361/73; 361/74; 361/75; 901/3; 701/23; 173/340

(58) Field of Search ................................ 700/256, 245, 700/264; 901/3; 701/23; 714/15, 24; 713/340; 361/680, 683, 71, 72, 73, 74, 75

(56) References Cited

U.S. PATENT DOCUMENTS

| | | | |
|---|---|---|---|
| 4,888,708 A | * 12/1989 | Brantmark et al. | ......... 700/264 |
| 4,983,818 A | * 1/1991 | Knowles | ................ 235/462.47 |
| 5,117,325 A | * 5/1992 | Dunk et al. | .................... 361/71 |

(List continued on next page.)

FOREIGN PATENT DOCUMENTS

| | | |
|---|---|---|
| DE | 4340069 A1 | 6/1995 |
| DE | 69111331 T2 | 1/1996 |
| DE | 19614201 A1 | 11/1997 |
| DE | 19728726 A1 | 1/1998 |
| EP | 0471860 B1 | 7/1995 |

OTHER PUBLICATIONS

John Lentz, Kuka Roboter GmbH–Controller, KCP and entirely new control concept, Technical Papers, Oct. 19, 2001.*
John Lentz, Kuka Robot Hangles Ingress/Egress Seat Testing.*
Fiedler et al., Open architecture robot controllers and workcell integration, Internet, Oct. 19, 2001.*

(List continued on next page.)

*Primary Examiner*—William A. Cuchlinski, Jr.
*Assistant Examiner*—McDieunel Marc
(74) *Attorney, Agent, or Firm*—McGlew and Tuttle, P.C.

(57) ABSTRACT

A method for handling the voltage drop, at least in the control unit of a robot with a PC control is provided that minimizes the time of a plant stoppage and avoids wasteful process interruptions. The PC control has a real time operating system for the time critical control and regulation of the robot movement and a standard PC operating system for communication with an operator. In the case of a voltage drop a battery/accumulator operation takes place with running robot movement and optionally application operations broken off or ended in a clearly defined manner. Then, working processes of the control are terminated. The contents of the working memory at the termination time concerning the real time operating system and robot control programs are stored, particularly as an image, in at least one mass memory. For restarting the robot after such a stoppage thereof the standard PC operating system is loaded in the conventional manner into the working memory and started. The contents relating to the state of the real time operating system and the robot programs in the termination state are transferred from the mass memory or memories, where they are in particular present in image form, into the working memory and the control of the robot and optionally also miscellaneous peripherals, are resumed in the termination state.

6 Claims, 4 Drawing Sheets

U.S. PATENT DOCUMENTS

| | | | | | |
|---|---|---|---|---|---|
| 5,294,782 A | * | 3/1994 | Kumar | ........................ | 235/380 |
| 5,432,510 A | * | 7/1995 | Matthews | ..................... | 341/20 |
| 5,630,155 A | * | 5/1997 | Karaki et al. | ................ | 713/340 |
| 6,034,508 A | * | 3/2000 | Chang | ......................... | 320/138 |
| 6,134,102 A | * | 10/2000 | Worn et al. | .................. | 361/680 |
| 6,178,523 B1 | * | 1/2001 | Klein | ........................... | 714/24 |

OTHER PUBLICATIONS

Prabhakara, A fast discrete method for voltage drop and current claculation for manufacturing facilities with intermittent loads, 1992, IEEE, 329–335.*

KUKA Working Ideas, Production monitoring and process control robotic measurement, Internet, Jan. 2000.*

Prabhakara, A fast discrete method for voltage drop and current claculation for manufacturing facilites with intermittent loads, 1990, IEEE 62–67.*

Parabhakaara et al., Frequency and duration of voltage drop in plants with intermittent loads, 1991, IEEE, pp. 1584–1590.*

Meinrad Happacher 1996 "Nicht aufzuhalten Steuerungstechnik im Sog der PC–Technologie" Elekronik No.

Dr.–Ing. Jörg F. Wollert 1997 "Doping für den Betz,zebssystem–Kern—Echtzeit–L6sungen far Windows NT im Vergleich" Elektronik No.

* cited by examiner

METHOD FOR HANDLING A VOLTAGE DROP IN THE CONTROL OF A ROBOT AND FOR RESTARTING A ROBOT FOLLOWING A VOLTAGE DROP

FIELD OF THE INVENTION

The invention relates to a method for handling a voltage drop in a control unit of a robot with a PC control of a combination of a real time operating system, for the time critical control and regulation of the robot movement, and only a time limited standard PC operating system for communicating with an operator where a battery/accumulator operation takes place in the case of a voltage drop.

BACKGROUND OF THE INVENTION

The invention relates to a method for restarting a robot following the stoppage thereof due to a voltage drop.

In the case of a voltage drop or breakdown, it is known to terminate a program in a controlled manner by the buffer storage of electrical energy by means of an accumulator battery. Optionally, a mechanism controlled by the program, such as that of a robot, is also stopped in a controlled manner by utilizing stored buffer energy. Following voltage return, the control implemented by a computer has to be restarted and performs a so-called cold start, in which at the end of the starting process it is in the initial state as for a complete restart. In order that a robot can execute a problem and carry out its work, it must generally be initially moved by hand out of the component which it has been working. Its working program must be reselected and operated up to the break point and then work is continued following the restoration of the corresponding state. This procedure requires an experienced operator, it is fault-prone and in certain circumstances takes up a considerable amount of time. If a new workpiece is being machined, then the workpiece which has not been completely machined constitutes waste and is therefore also a cost factor.

Particularly with a PC-based control, the hardware and consequently the state of the working memory can only be buffer stored for a limited time by accumulator/battery buffering in the case of a voltage breakdown, so that an extensive automatic restoration of the stored control state following voltage recovery and start-up is only possible within a limited time, but not in the case of a longer voltage interruption. As the performance of a number of operating system processes is necessary for starting a conventional personal computer, this status in the cut-off or stoppage state cannot be readily transferred into the working memory.

The problem of the invention is to provide a method through which a plant or equipment stoppage is time-minimized and as far as possible waste resulting from the process interruption is avoided.

SUMMARY OF THE INVENTION

According to the invention this problem is solved in that initially in the case of a method of the aforementioned type a rotor movement taking place and optionally application operations are broken off or stopped in a clearly defined manner, that subsequently working processes of the control are terminated and that exclusively the contents of the working memory at the stoppage time concerning the real time operating system and robot control programs are stored in a mass memory.

The termination or controlled breaking off of the robot movement, etc. here means that the working process as such is not brought to an end and instead the working process is broken off, the movement as such is ended and the robot is stopped, but in a controlled manner, so that there is no danger or damage.

Therefore the important information concerning the status of the robot present in the working memory on stoppage as a result of a voltage drop are securely stored, so that such information is available for a random period of time independently of the electric power supply.

On this basis the invention also provides a method for the restarting of a robot stopped in this way, in which the standard PC operating system is loaded in the conventional manner into the working memory and started and the contents relating to the state of the real time operating system supplement or attachment and the robot programs in the end state are transferred from the mass memory or memories into the working memory and the control of the robot at the end state is resumed.

As a result of the invention the robot is integrated as a single installation or in cells or a larger union and at voltage recovery can seamlessly return to the interrupted program execution either automatically or under operator control.

According to a preferred development the contents of the working memory relating to the real time operating system and robot control programs are stored as an image in the mass memory or memories and that an image containing the state of the real time operating system and the robot programs is transferred from the mass memory or memories into the working memory. According to another development, on restarting the control of miscellaneous process peripherals in the end state is resumed, so that the entire process can be directly continued at the stoppage point.

Thus, according to the invention, only the working memory content relating to or containing the real time operating system with incorporated robot programs, e.g. VxWORKS are buffer stored in the mass memory or memories, but not the standard PC operating system, such as e.g. WINDOWS 95, 98 or NT. On restarting the standard operating system is started again in the conventional manner and the computer hardware is completely newly initialized. Subsequently the secured image of the real time operating system, particularly the robot programs is loaded back from the mass memory into the working memory, so that the control of the robot at the break point can be seamlessly continued. External communication interfaces to industrial working processes, such as those of further tools, particularly a welding or gluing device, etc. are restored to the state prior to interruption. The method according to the invention permits the use of standardized PC hardware, particularly with dynamic working memories i.e., dynamic random access memory (DRAM) for the control of robots and therefore reduces costs, also with respect to the software to be used.

In a preferred development of the method according to the invention, in the case of a voltage drop, the rotor movement is subject to braking close to the path. The control and regulation of the robot remains active until the stored motive energy has been consumed. This more particularly relates to electrical energy or power stored in the d.c. voltage buffer of the servoconverter (bank of capacitors) and optionally kinetic energy stored back in the same on braking.

BRIEF DESCRIPTION OF THE DRAWINGS

Further advantages and features of the invention can be gathered from the claims and the following description of an embodiment of the invention with reference to the attached drawings.

In the drawings.

DETAILED DESCRIPTION OF THE DRAWINGS

Figure 1:
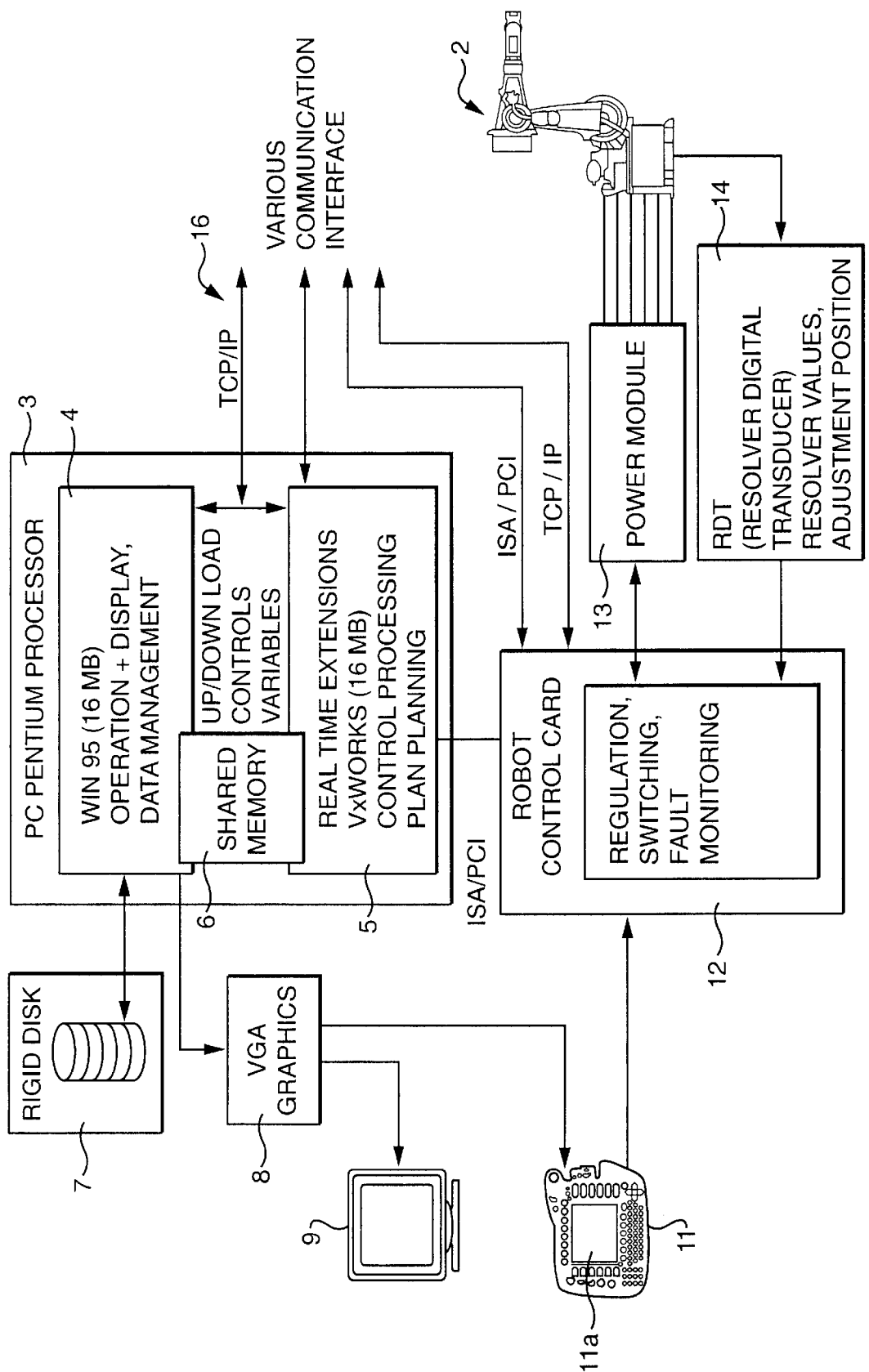
FIG. 1 is a diagrammatic representation of the robot control forming the basis for the invention.

In the represented embodiment the control 1 for a robot 2 is based on a PC computer with a PC motherboard 3 with at least one PC Pentium processor, on which there is a joint operation of a non-real time standard PC operating system 4 such as WINDOWS 95 or 98 and a real time operating system such as VxWorks. The standard PC operating system 4 and the real time operating system 5 jointly use the working memory 6. A mass memory 7 is connected to the motherboard 3.

The standard operating system 4 more particularly serves to communicate with an operator and with mass memory media. For this purpose it is connected to several operator peripherals and via a graphic display adaptor 8 to a monitor 9 and to the display 11a of a control unit 11, which in turn communicates with a robot control card 12 connected to the real time operating system 5. By means of a power module 13, the robot control card 12 controls the robot 2, whose positions and movement data measured by movement and position measuring devices etc., are communicated by means of a transducer unit 14 to the robot control card 12. In particular the robot control card 12 and the real time operating system 5 are connected via various communication measuring points 16 to industrial peripherals, path controls for tools, particularly gluing and welding devices, etc.

Figure 4:
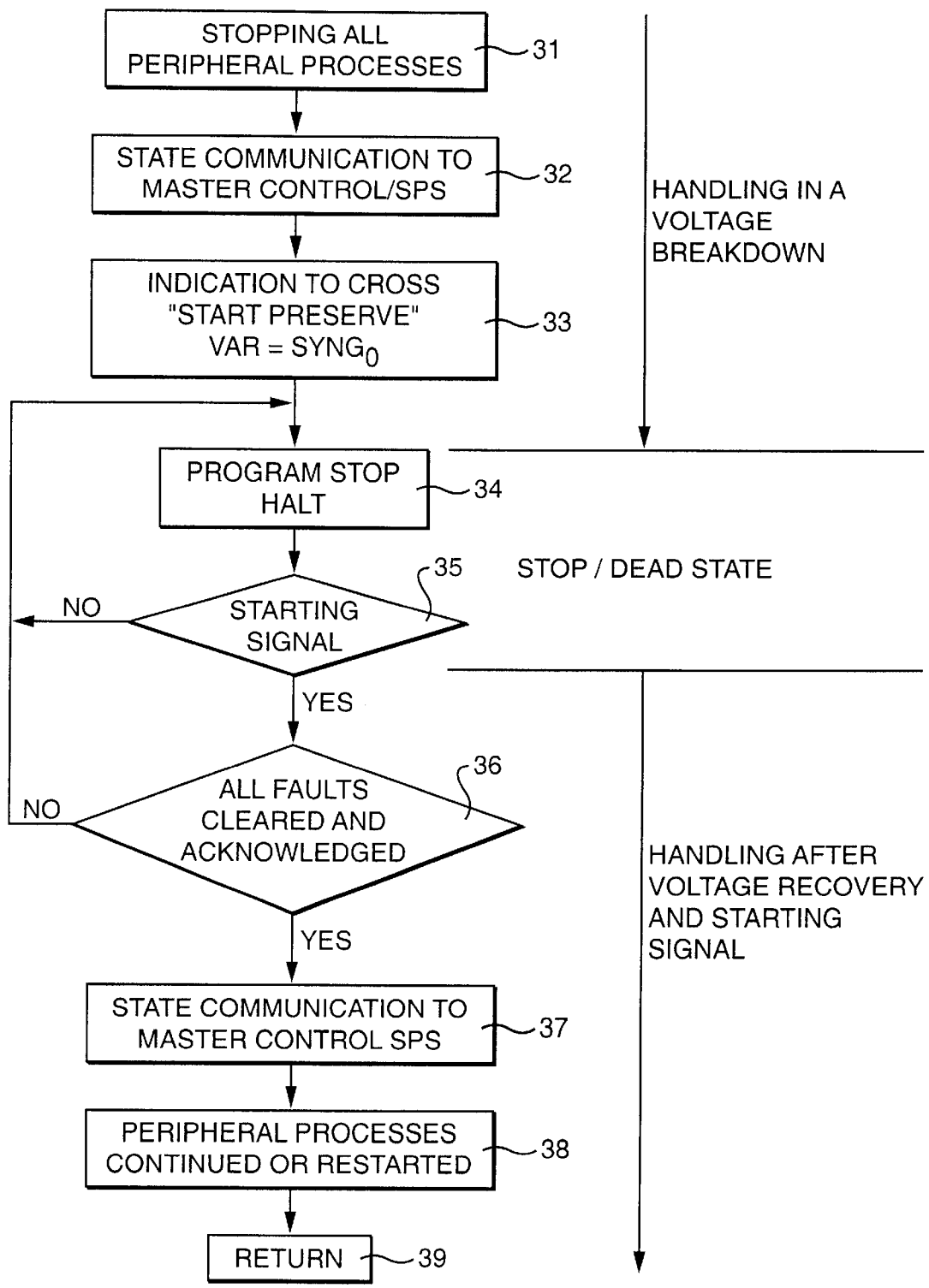
FIG. 4 is a flow diagram for securing the state of the memory content on ending the working sequence after a voltage drop and for the resumption of working after voltage recovery.

In such a control the invention provides a control module with which it is possible to handle or control the sequence of the control and robot in the case of a voltage drop. The not shown power supply unit of the control 1 has an also not shown voltage detector, by means of which the operating system in a first step a detects a possible voltage drop, which it communicates to the control module in step 22. The control module initializes in step 23 a program (FIG. 4), which in a further step 31 breaks off the working processes controlled via peripheral communication interfaces 16.

The robot 2 is subject to braking close to the path, i.e. movement corresponding to the predetermined path is transferred into a rest state until the motive energy still present is consumed. This can be energy stored in the d.c. voltage buffer of the servoconverter (bank of capacitors) of the robot and optionally kinetic energy of the robot elements and the energy resulting from the braking of moving spindles and which is fed back into the buffer. At reversal points and in the case of upward movements the stoppage of the robot spindles is rapidly achieved and in the latter case is significantly helped by the gravitational force. Longer braking times are necessary for high speeds with a considerable inertia.

Following a controlled breaking off of all external or mechanical processes, particularly the robot movements, there is a state communication to external controls (step 32) and then in a step 33 there is a corresponding notification to the control module, which in step 24 secures the robot programs (in their then state) in the mass memory 7. The real time operating system, following the controlled breaking off of all the processes and in particular the robot movements passes in step 25 into a clearly defined state and then secures the complete real time operating system (step 26 or 26') with a voltage drop information (step 27 or 27'), which in the case of a new start ensures that it imitates a hot start, in which the real time operating system and robot programs with all the stored states are taken over by the mass memory 7 and the control is continued from this state.

Then, in step 28, the control module switches off the voltage supply of the tip to then securing accumulator or battery.

If during the above-described breaking off or stoppage of the robot movement, peripheral work and during the running down of the system an error or fault occurs, said fault state is admittedly stored in the mass memory 7 to permit an analysis, but the voltage breakdown information is of such a nature that the next start of the system is a cold start, where standard data are used as a basis, because further working with such a fault state is not appropriate.

When a voltage supply is restored, in the conventional manner, in the control 1 the non-real time standard PC operating system (WINDOWS 95) is started (step 41), which polls the control module in step 42. The latter relates to the voltage breakdown information filed at the terminating step 27 and optionally leads to the hot start necessary for recommencing robot activity at the working point reached, i.e. a restarting of the system with secured or preserved data (steps 43, 44 or 44').

In the following step 45 the control state at voltage breakdown is restored. For this purpose the real time operating system 5 with the robot programs is read from the mass memory 7 and restored in the working memory 6 (steps 46–48). Then the starting image of the peripheral systems in the stoppage state is restored (step 49).

Figure 2:
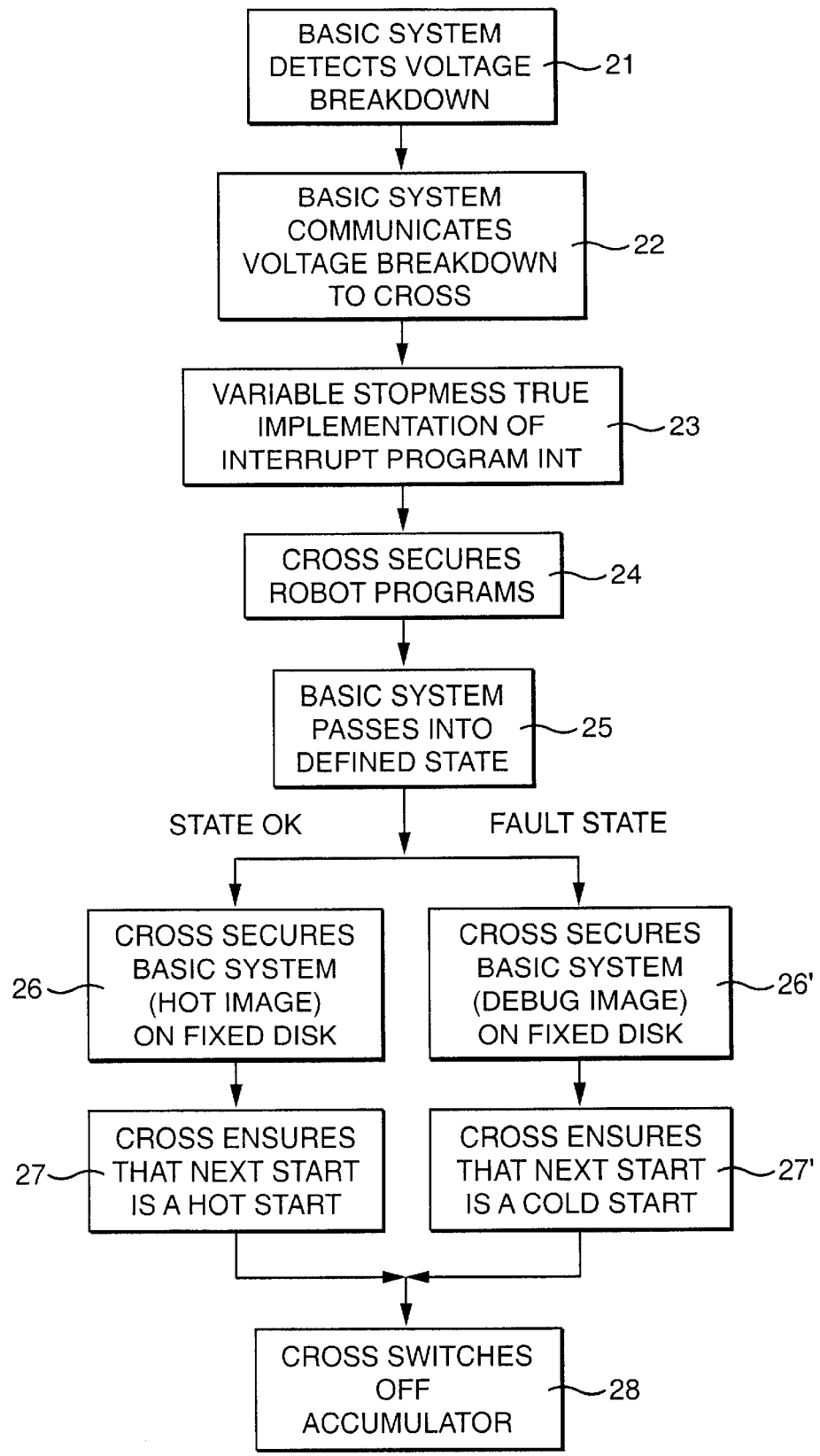
FIG. 2 is a flow diagram concerning the inventive method for the control of a robot in the case of a voltage drop.
Figure 3:
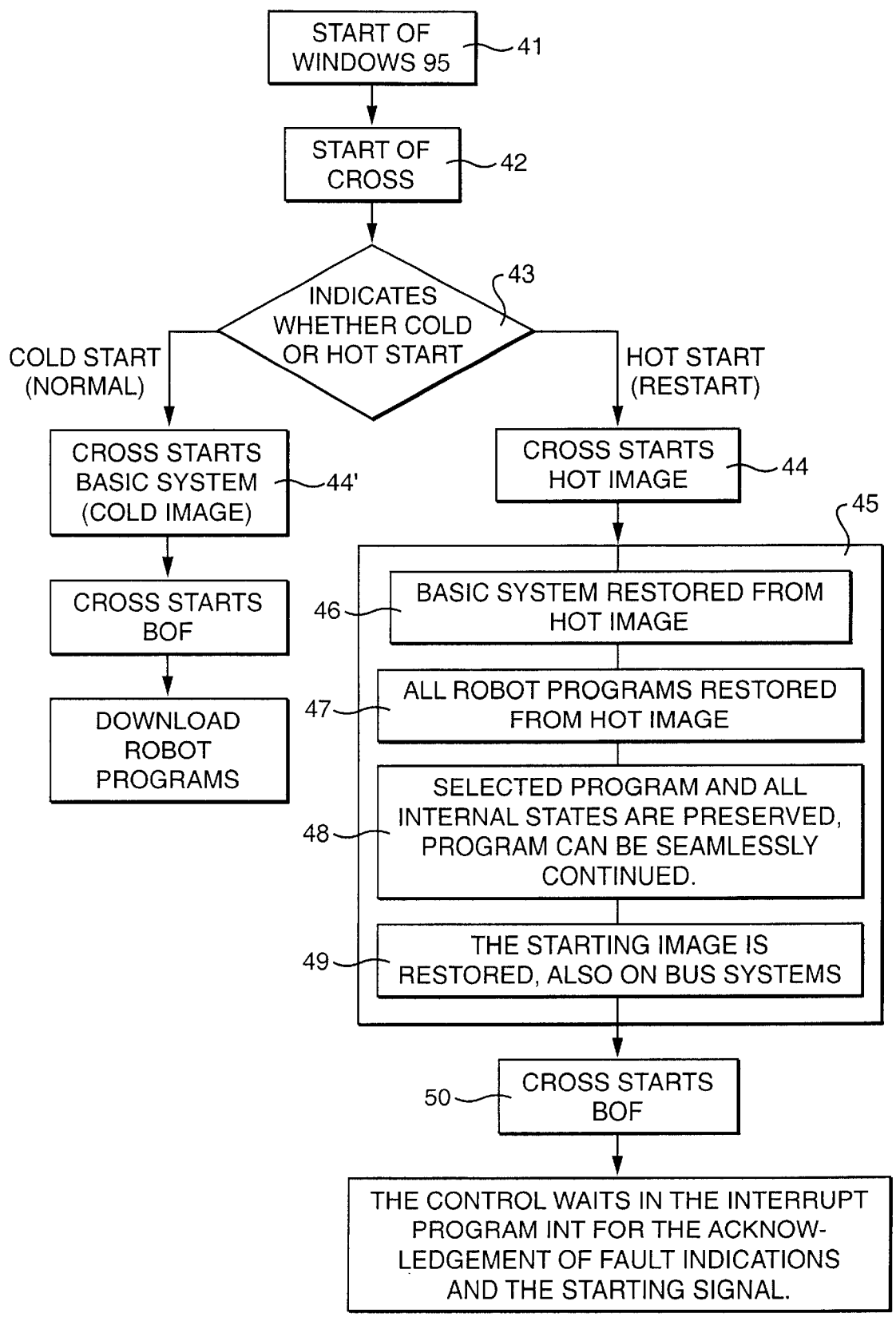
FIG. 3 is a flow diagram of the inventive method on restarting the robot following a voltage drop.

After restoring the data in the working memory 6 the operating surface and in particular the displays 9, 11 are returned to the state in the stoppage situation (step 50). The robot program is at the point of the earlier stoppage (steps 34, 35 in FIG. 4) and after a starting signal checks whether all the faults have been cleared and acknowledged (step 36). This is followed by a state communication to the external controls (step 37) and the peripheral processes are continued or restarted (step 38). Then the main program can process in the sequence broken off through the voltage drop (step 39). A fault detected during stoppage (FIG. 2) leads to a conventional cold start (FIG. 3).

What is claimed is:

1. A method for handling a control unit voltage drop of a robot with a PC control in which a voltage drop direct current operation takes place, the method comprising the steps of:

providing PC control including a time critical control and regulation of the robot movement by a real time operating system and a control of a communication with an operator by a standard PC operating system; and breaking off or stopping in a defined manner one or both of running movement along a predetermined path and ongoing application operations including:

stopping robot movement close to the path;

subsequent to stopping robot movement terminating working processes of the control;

supplying DC voltage using a battery/accumulator; and storing exclusively the contents of a working memory relating to the real time operating system and robot control programs at a termination point as an image of the working memory in a mass memory or mass memories.

2. A method according to claim 1, further comprising:

restarting the robot following the stoppage of the robot including:

loading the standard PC operating system into the working memory in the conventional manner and staring the standard PC operating system;

transferring the contents from the mass memory or memories into the working memory relating to the real time operating system and the robot programs in a termination state for the termination point; and resuming the control of the robot from the termination state.

3. A method according to claim 2, wherein the image containing the state of the real time operating system and the robot programs is transferred from the mass memory or memories into the working memory.

4. A method according to claim 2, wherein upon restarting the robot the control of miscellaneous process peripherals is resumed from the termination state.

5. A method for handling a control unit voltage drop of a robot with a PC control, the method comprising the steps of:

providing PC control including a time critical control and regulation of the robot movement by a real time operating system and a control of a communication with an operator by a standard PC operating system; and breaking off or stopping in a defined manner one or both of running movement along a predetermined path and ongoing application operations including:

stopping robot movement by transferring movement corresponding to a predetermined path into a rest state until the motive energy still present is consumed;

subsequent to stopping robot movement terminating working processes of the control;

supplying DC voltage using a battery/accumulator; and storing the entire contents of a working memory relating to the real time operating system and robot control programs at a termination point providing the contents of the working memory in a mass memory or mass memories relating to the real time operating system and robot control programs for a termination state.

6. A method according to claim 5, further comprising:

restarting the robot following the stoppage of the robot including:

loading the standard PC operating system into the working memory in the conventional manner and starting the standard PC operating system;

transferring the contents from the mass memory or memories into the working memory relating to the real time operating system and the robot programs in the termination state for the termination point; and resuming the control of the robot from the termination state.

* * * * *